(12) United States Patent
Paulson et al.

(10) Patent No.: US 9,010,170 B2
(45) Date of Patent: Apr. 21, 2015

(54) METHOD AND APPARATUS TO TEST AN ACCELEROMETER

(75) Inventors: Hans Paulson, Horten (NO); Daniel Rönnow, Oslo (NO)

(73) Assignee: Westerngeco L.L.C., Houston, TX (US)

( * ) Notice: Subject to any disclaimer, the term of this patent is extended or adjusted under 35 U.S.C. 154(b) by 649 days.

(21) Appl. No.: 13/166,618

(22) Filed: Jun. 22, 2011

(65) Prior Publication Data

US 2012/0036931 A1 Feb. 16, 2012

Related U.S. Application Data

(60) Provisional application No. 61/374,002, filed on Aug. 16, 2010.

(51) Int. Cl.
| | | |
|---|---|---|
| G01P 21/00 | (2006.01) | |
| G01P 15/125 | (2006.01) | |
| G01P 15/13 | (2006.01) | |

(52) U.S. Cl.
CPC .............. *G01P 15/125* (2013.01); *G01P 15/131* (2013.01); *G01P 21/00* (2013.01)

(58) Field of Classification Search
USPC ............... 73/514.01, 514.16–514.18, 514.24, 73/514.32, 1.37, 1.38, 1.39, 1.41
See application file for complete search history.

(56) References Cited

U.S. PATENT DOCUMENTS

| | | |
|---|---|---|
| 4,300,220 A | 11/1981 | Goff et al. |
| 4,922,756 A | 5/1990 | Henrion |
| 5,049,795 A | 9/1991 | Moulds, III |
| 5,251,183 A | 10/1993 | McConnell et al. |
| 5,445,006 A | 8/1995 | Allen et al. |
| 5,479,161 A | 12/1995 | Keyes et al. |
| 5,852,242 A | 12/1998 | Dvolk et al. |
| 5,900,529 A | 5/1999 | Hanisko et al. |
| 6,023,960 A | 2/2000 | Abrams et al. |
| 6,035,694 A | 3/2000 | Dupuie et al. |
| 6,070,464 A | 6/2000 | Koury, Jr. et al. |
| 6,101,864 A | 8/2000 | Abrams et al. |
| 6,301,195 B1 | 10/2001 | Faber |

(Continued)

FOREIGN PATENT DOCUMENTS

| | | |
|---|---|---|
| EP | 1192419 B1 | 4/2007 |
| EP | 1358488 B1 | 1/2010 |

(Continued)

OTHER PUBLICATIONS

Wu et al., "Electromechanical ΔΣ Modulation With High-Q Micromechanical Accelerometers and Pulse Density Modulated Force Feedback," IEEE Transactions on Circuits and Systems, Feb. 2006, vol. 53(2): pp. 274-287.

(Continued)

*Primary Examiner* — Peter Macchiarolo
*Assistant Examiner* — Nathaniel Kolb

(57) ABSTRACT

A technique includes using an accelerometer to provide an output signal indicative of an acceleration experienced by a movable mass of a sensor of the accelerometer. The technique includes testing the accelerometer, and the testing includes using a closed loop including the sensor to provide the output signal of the accelerometer; injecting a test signal into the loop between an output terminal of the sensor and an output terminal of the accelerometer; and indicating a performance of the accelerometer based on a response of the accelerometer to the injection of the test signal.

22 Claims, 5 Drawing Sheets

(56) References Cited

U.S. PATENT DOCUMENTS

| | | | |
|---|---|---|---|
| 6,353,577 B1 | 3/2002 | Orban et al. | |
| 6,430,105 B1 | 8/2002 | Stephen | |
| 6,497,146 B1 | 12/2002 | Hobbs et al. | |
| 6,497,149 B1 | 12/2002 | Moreau et al. | |
| 6,725,164 B1 | 4/2004 | Bednar | |
| 6,758,080 B1 | 7/2004 | Ragan et al. | |
| 6,792,792 B2* | 9/2004 | Babala | 73/1.38 |
| 6,805,008 B2 | 10/2004 | Selvakumar et al. | |
| 6,814,179 B2 | 11/2004 | Corrigan et al. | |
| 6,861,587 B1 | 3/2005 | Selvakumar et al. | |
| 6,871,544 B1 | 3/2005 | Selvakumar et al. | |
| 6,883,638 B1* | 4/2005 | Maxwell et al. | 181/102 |
| 6,928,875 B2 | 8/2005 | Bickford et al. | |
| 6,943,697 B2 | 9/2005 | Ciglenec et al. | |
| 6,945,110 B2 | 9/2005 | Selvakumar et al. | |
| 7,012,853 B2 | 3/2006 | Iseli et al. | |
| 7,059,189 B2 | 6/2006 | Drabe et al. | |
| 7,114,366 B1 | 10/2006 | Jones et al. | |
| 7,232,701 B2 | 6/2007 | Gogoi et al. | |
| 7,236,279 B2 | 6/2007 | Yu et al. | |
| 7,273,762 B2 | 9/2007 | Gogoi | |
| 7,274,079 B2 | 9/2007 | Selvakumar et al. | |
| 7,292,504 B2 | 11/2007 | Luc | |
| 7,293,460 B2 | 11/2007 | Zarabadi et al. | |
| 7,337,671 B2 | 3/2008 | Ayazi et al. | |
| 7,426,438 B1 | 9/2008 | Robertsson | |
| 7,676,327 B2 | 3/2010 | Ozdemir et al. | |
| 7,729,202 B2 | 6/2010 | Eperjesi et al. | |
| 7,734,838 B2 | 6/2010 | Pavel et al. | |
| 7,755,970 B2 | 7/2010 | Welker et al. | |
| 8,104,346 B2 | 1/2012 | Paulson | |
| 2004/0194532 A1* | 10/2004 | Lally et al. | 73/1.82 |
| 2006/0021435 A1 | 2/2006 | Orsagh et al. | |
| 2007/0286023 A1 | 12/2007 | Bull et al. | |
| 2008/0021658 A1 | 1/2008 | Pavel et al. | |
| 2008/0028823 A1* | 2/2008 | Samuels | 73/1.37 |
| 2008/0062815 A1 | 3/2008 | Iseli | |
| 2008/0275649 A1 | 11/2008 | Ozdemir et al. | |
| 2008/0312878 A1 | 12/2008 | Robertsson et al. | |
| 2008/0316859 A1 | 12/2008 | Welker et al. | |
| 2009/0003132 A1 | 1/2009 | Vassallo et al. | |
| 2009/0022009 A1 | 1/2009 | Ozdemir et al. | |
| 2009/0056411 A1 | 3/2009 | Goujon et al. | |
| 2010/0002541 A1 | 1/2010 | Ozdemir et al. | |
| 2010/0116054 A1 | 5/2010 | Paulson | |
| 2010/0132467 A1 | 6/2010 | Ko et al. | |
| 2012/0082001 A1 | 4/2012 | Welker | |

FOREIGN PATENT DOCUMENTS

| | | |
|---|---|---|
| GB | 2086055 A | 5/1982 |
| WO | 2010054216 A2 | 5/2010 |

OTHER PUBLICATIONS

Dong et al., "Force feedback linearization for higher-order electromechanical sigma-delta modulators," J. Micromech. Microeng., 2006, vol. 16: pp. S54-S60.

Dufort et al., "On-Chip Analog Signal Generation for Mixed-Signal Built-In Self-Test," IEEE Journal of Solid-State Circuits, Mar. 1999, vol. 34(3): pp. 318-330.

Kinney, "Characterization of a MEMS Accelerometer for Intertial Navigation Applications, Sandia National Laboratories," 1999: pp. 1-12.

Lemkin et al., "A 3-Axis Force Balanced Accelerometer Using a Single Proof-Mass," IEEE, 1997: pp. 1185-1188.

Yuan et al., "Orientation of Non-Gimballed Three-Component Geophones in SEa-Floor Data," EAGE 59th Conference and Technical Exhibition, May 1997: pp. 1-2.

* cited by examiner

METHOD AND APPARATUS TO TEST AN ACCELEROMETER

This application claims the benefit under 35 U.S.C. §119 (e) to U.S. Provisional Patent Application Ser. No. 61/374,002 entitled, "TEST OF AN ACCELEROMETER," which was filed on Aug. 16, 2010, and is hereby incorporated by reference in its entirety.

BACKGROUND

The invention generally relates to a method and apparatus to test an accelerometer.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

SUMMARY

In an embodiment of the invention, a technique includes using an accelerometer to provide an output signal that is indicative of an acceleration experienced by a movable mass of a sensor of the accelerometer. The technique includes testing the accelerometer, and the testing includes using a closed loop including the sensor to provide the output signal; injecting a test signal into the closed loop between an output terminal of the sensor and an output terminal of the accelerometer; and indicating a performance of the accelerometer based on a response of the accelerometer to the injection of the test signal.

In another embodiment of the invention, an accelerometer includes a closed loop and a tester. The closed loop includes a sensor that includes a movable mass to sense an acceleration and an output terminal to provide an output signal indicative of the sensed acceleration. The closed loop is adapted to provide a feedback signal to adjust a restoring force that is applied to the movable mass. The tester is adapted to inject a test signal into the closed loop between an output terminal of the sensor and the output terminal of the closed loop to cause a signal at the output terminal of the closed loop to indicate a performance of the accelerometer in response thereto.

In yet another embodiment of the invention, an apparatus includes a seismic acquisition system that includes at least one accelerometer. The accelerometer includes a closed loop and a tester. The closed loop includes a sensor that includes a movable mass to sense an acceleration and an output terminal to provide an output signal, which is indicative of the sensed acceleration. The closed loop is adapted to provide a feedback signal to adjust a restoring force that is applied to the movable mass. The tester is adapted to inject a test signal into the closed loop between an output terminal of the sensor and the output terminal of the closed loop to cause a signal at the output terminal of the closed loop to indicate a performance of the accelerometer in response thereto.

Advantages and other features of the invention will become apparent from the following drawing, description and claims.

DETAILED DESCRIPTION

Figure 1:
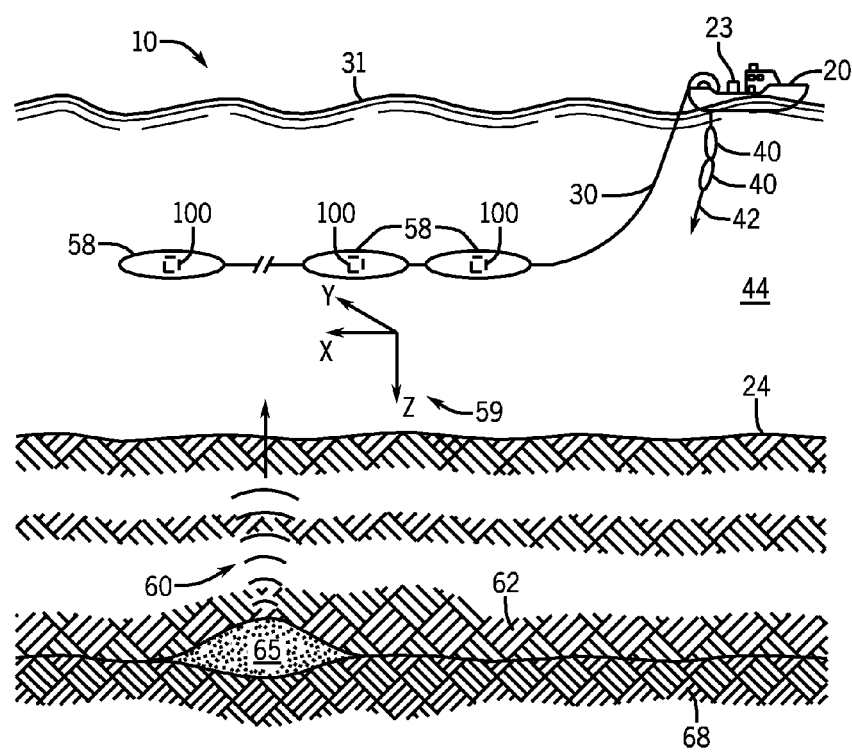
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. In accordance with embodiments of the invention, the streamers 30 contain seismic sensor units 58, each of which contains a multi-component sensor. The multi-component sensor includes a hydrophone and particle motion sensors, in accordance with some embodiments of the invention. Thus, each sensor unit 58 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component sensor may include one or more hydrophones, geophones, particle displacement sensors, particle velocity sensors, accelerometers, pressure gradient sensors, or combinations thereof.

As a more specific example, in accordance with some embodiments of the invention, a particular multi-component sensor may include a hydrophone for measuring pressure and three orthogonally-aligned accelerometers to measure three corresponding orthogonal components of particle velocity and/or acceleration near the sensor. It is noted that the multi-component sensor may be implemented as a single device (as depicted in FIG. 1) or may be implemented as a plurality of devices, depending on the particular embodiment of the invention. A particular multi-component sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

In accordance with embodiments of the invention described herein, the multi-component sensor includes at least one capacitive microelectromechanical system (MEMS)-based accelerometer 100, which is advantageous due to its size, low power dissipation and low cost. For purposes of simplifying the following discussion, embodiments are described below in which the accelerometer 100 senses acceleration along a single sensitive axis. However, the accelerometer 100 may sense acceleration along two or three orthogonal sensitive axes, in accordance with other embodiments of the invention.

In addition to the streamers 30 and the survey vessel 20, marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors of the streamer(s) 30. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the streamer(s) 30 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component sensor may provide a trace, which corresponds to a measure of a pressure wavefield by its hydrophone; and the sensor may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

Figure 4:
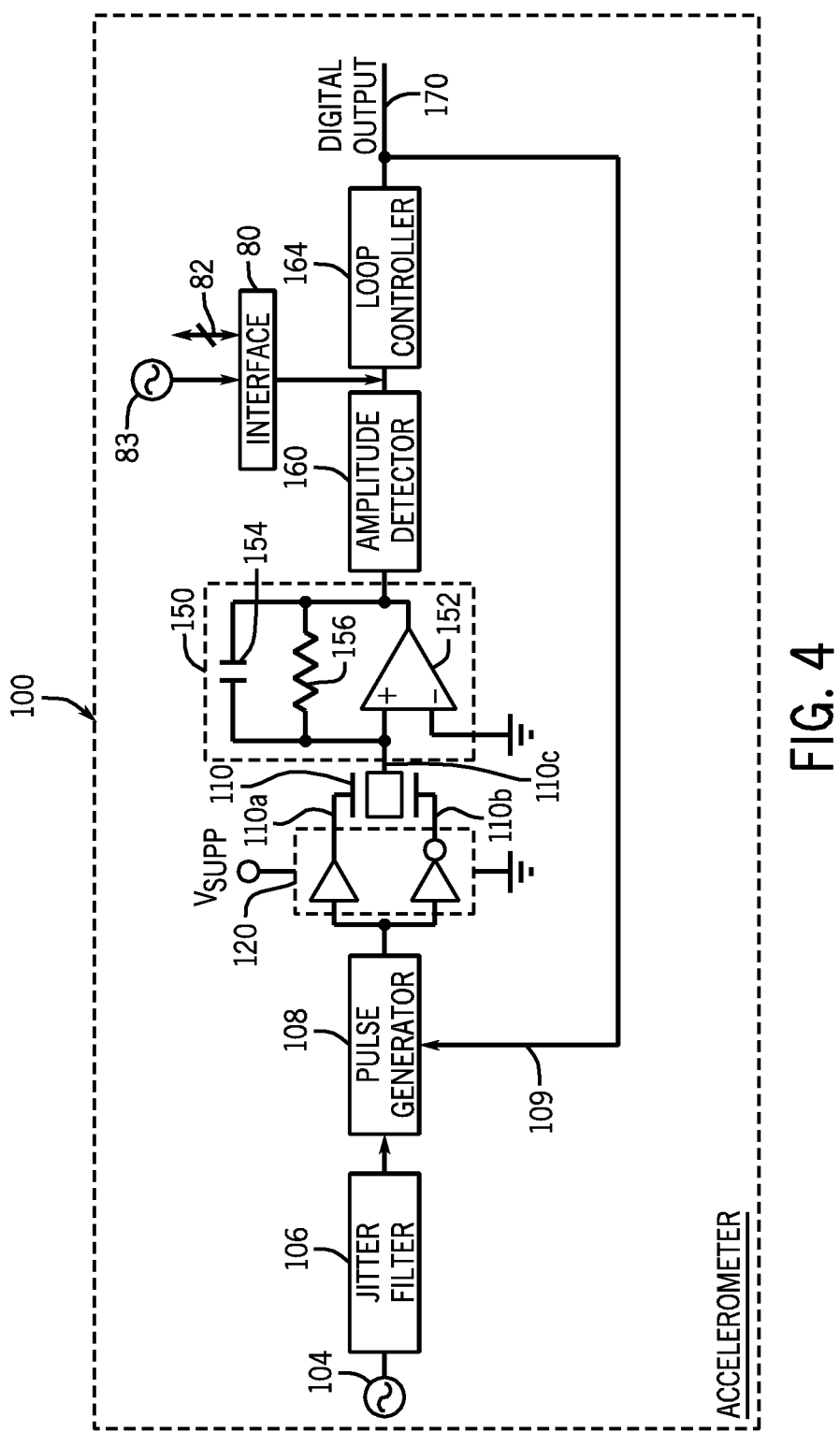
FIGS. 4 and 5 are schematic diagrams of accelerometers according to embodiments of the invention.

Referring to FIG. 4, in accordance with some embodiments of the invention, the accelerometer 100 includes a capacitive MEMS-based sensor 110. The sensor 110 includes an armature and a pair of fixed position electrodes 110a and 110b (called "fixed electrodes" herein), which are rigidly attached to the armature. The sensor 110 also includes at least one mobile electrode 110c, which is mounted on a moving proof mass that is suspended between the two fixed electrodes 110a and 110b by springs that are also connected to the armature. This structure forms a differential capacitor, in which the mobile electrode 110c moves along a sensitive axis in response to an external acceleration.

The differential capacitor is formed from two capacitors: a first capacitor is formed between the electrodes 110a and 110c; and another capacitor (in series with the other capacitor) is formed between the electrodes 110c and 110b. Movement of the mobile electrode 110c increases the capacitance of one of these two capacitors and conversely, decreases the capacitance of the other capacitor, depending on the particular direction of the movement. The differential capacitance may be sensed for purposes of determining the direction and degree of sensed acceleration.

For purposes of allowing the differential capacitance of the sensor 110 to be sensed, the accelerometer 100 includes a charge amplifier 150, which has an input terminal that is continuously coupled to the mobile electrode 110c of the sensor 110. In other words, the input terminal of the charge amplifier 150 is continuously coupled to the mobile electrode 110c during times in which the sensor 110 receives both actuation and activation voltages. The charge amplifier 150 is part of a feedforward path that produces a digital output signal at the accelerometer's output terminal 170, which is indicative of the sensed acceleration. This feedforward path may also include, for example, a sigma delta modulator that is formed from an amplitude detector 160 (coupled to the output terminal of the charge amplifier 150) and a loop controller 164 (coupled to the output terminal 170). The accelerometer 100 also includes a feedback system to employ a closed loop control for purposes of maintaining the proof mass in its equilibrium position.

As depicted in FIG. 4, this feedback system is formed via a feedback line 109 that couples the output terminal 170 to a pulse generator 108. The pulse generator 108, in response to the output signal of the accelerometer 100, generates a pulse train signal that is received by a complimentary logic driver 120 of the accelerometer 100. In response to this pulse train signal 210, the driver 120 generates a driving signal, which is applied across the fixed electrodes 110a and 110b of the sensor 110.

More specifically, when subjected to inertial forces caused by an external acceleration, the proof mass is kept in the equilibrium position by electrostatic forces controlled by the accelerometer's feedback system. The amplitude detector 160 and the loop controller 164 of the accelerometer 100 each have a relatively high gain, and the residual movement of the mobile mass with respect to its equilibrium position is therefore kept close to zero. The magnitude and direction of the net restoring force is given as the difference between two attractive forces working in opposite directions. For example, if the external acceleration force tends to move the mobile electrode closer to fixed electrode 110b, the loop controller 164 increases the electrostatic force between the mobile electrode and the fixed electrode 110a and, simultaneously, decreases the electrostatic force between the mobile electrode and the fixed electrode 110b. The complementary actuation voltages are switched between zero voltage and the full supply voltage at a high repetition frequency, and the effective actuation force is governed by the duty-cycle of the pulse train signal that is generated by the pulse generator 108.

Among its other features, in accordance with some embodiments of the invention, the accelerometer 100 may include a jitter filter 106 that is located between a system clock generator 104 and the clock input terminal of the pulse generator 104. Clock jitter, in general, modulates the effective force that is applied by the feedback pulses and may therefore be a dominant cause of noise in the actuator function. In accordance with some embodiments of the invention, the jitter filter 106 is a phase locked loop (PLL), which filters out jitter from the system's reference clock; and thus, the clocking system does not use a crystal resonator, thereby facilitating a simpler and more economic system integration.

More details regarding the general operation of the accelerometer 100 may be found in U.S. patent application Ser. No. 12/268,064, entitled, "MEMS-BASED CAPACITIVE SENSOR,", which was filed on Nov. 10, 2008, and is hereby incorporated by reference in its entirety.

Figure 2:
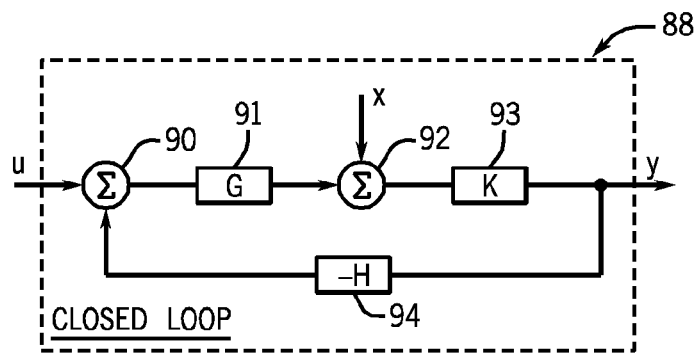
FIG. 2 is a model of an accelerometer employing closed loop control according to an embodiment of the invention.

For purposes of performing a built-in test, the accelerometer 100 includes a signal source 83, which injects a test signal into the above-described closed loop. In this manner, in accordance with some embodiments of the invention, a control interface 80 of the accelerometer 100 may periodically or upon being instructed to do so by external requests, turn on, or enable, the signal source 83 for purposes of injecting the test signal. As depicted in FIG. 2, the control interface 80 may generally include input and output terminals 82 to control operations of the accelerometer 100, control the built-in self test of the accelerometer 100, communicate sensed accelerations to other circuitry (the signal processing unit 23 of FIG. 1, for example), communicate results of the self test to external circuitry, etc. In accordance with embodiments of the invention described herein, the test signal is injected in the feedforward path between the mobile electrode 110c (i.e., the output terminal of the sensor 110) and the accelerometer's digital output terminal 78. More specifically, as depicted in FIG. 4, in accordance with some embodiments of the invention, the test signal is injected between an output terminal of the amplitude detector 160 and an input terminal of a loop controller 164.

Figure 3:
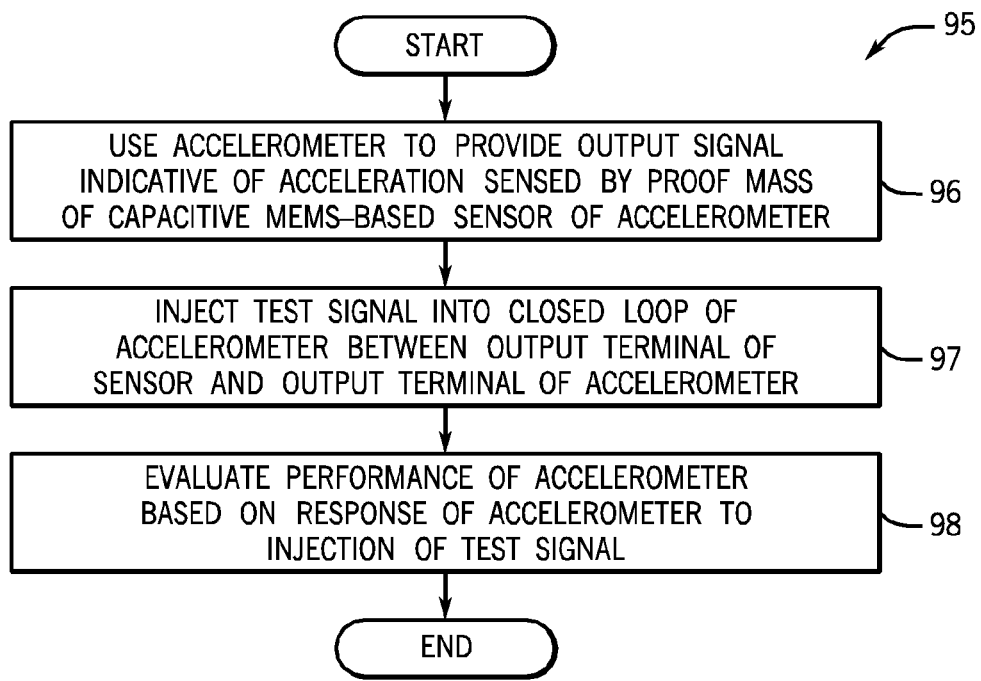
FIG. 3 is a flow diagram depicting a technique to test an accelerometer according to an embodiment of the invention.

Referring to FIG. 2 in conjunction with FIG. 4, a model 88 of the closed loop of the accelerometer 100 includes a transfer function 91 (having a gain G), which represents the transfer function of the sensor 110. As shown in FIG. 3, the transfer function 81 receives the output of an adder 90 as an input. The adder 90 receives a signal called "u," which represents the sensed acceleration and a signal derived from a transfer function 94 (having a gain –H), which represents the forced feedback path of the closed loop 88. As also shown in FIG. 3, the closed loop 88 includes an adder 92, which receives the output of the transfer function 91 and a signal called "x," which represents the test signal that is injected by the signal source 83. The output signal from the adder 92 is provided to a transfer function 93 (having a gain K), which represents the transfer function of the loop controller 164 (see FIG. 2) to produce a corresponding output signal (called "y," in FIG. 3) of the closed loop. Moreover, as depicted in FIG. 3, the y output signal is received by the transfer function 94 in the forced feedback path.

Because the x test signal is injected into the feedforward path after the sensor 110 but before the loop controller 164, the y output signal is sensitive to the open loop properties of the sensor 110. The open loop properties of the sensor 110, in turn, affect the dynamic range of the accelerometer 100, such as the parameters for the fundamental resonance frequency and damping of the accelerometer 100. In general, these parameters may not be directly measurable in an accelerometer based on electrostatic force feedback, because the effective stiffness of the suspension is affected by the electrostatic forces.

Referring back to FIG. 4, in accordance with some embodiments of the invention, the control interface 80 may generate signals to perform the built-in self test and evaluate the test results. For these embodiments of the invention, the control interface 80 may from time to time, or upon being instructed by external circuitry (a controller for a streamer on which the accelerometer 100 is disposed, as a non-limiting example), measures the y output signal in response to the x test signal, evaluate the performance of the sensor 110 and communicate the calculated parameters to external circuitry. Alternatively, in accordance with other embodiments of the invention, the control interface 80 does not perform a performance analysis, but rather, initiates the x test signal so that external circuitry may process the y output signal provided by the accelerometer 100 for purposes of evaluating the accelerometer's performance.

It is noted that the systems and techniques that are disclosed herein may be used for testing one axis accelerometers or alternatively, two or three axis accelerometers having one, two or three channels. If there is more than one channel, cross axis sensitivity may be tested if one channel is excited by a test signal, and the other channels record normal data. Thus, many variations are contemplated and are within the scope of the appended claims.

Referring to FIG. 3, to summarize, a technique 95 in accordance with embodiments of the invention disclosed herein includes using (block 96) an accelerometer to provide an output signal indicative of acceleration sensed by a proof mass of a capacitive MEMS-based sensor of an accelerometer. The technique 95 includes injecting (block 97) a test signal into a closed loop of the accelerometer between the output terminal of the sensor and the output terminal of the accelerometer; and evaluating (block 98) the performance of the accelerometer based on the response of the accelerometer to the injection of the test signal.

Figure 5:
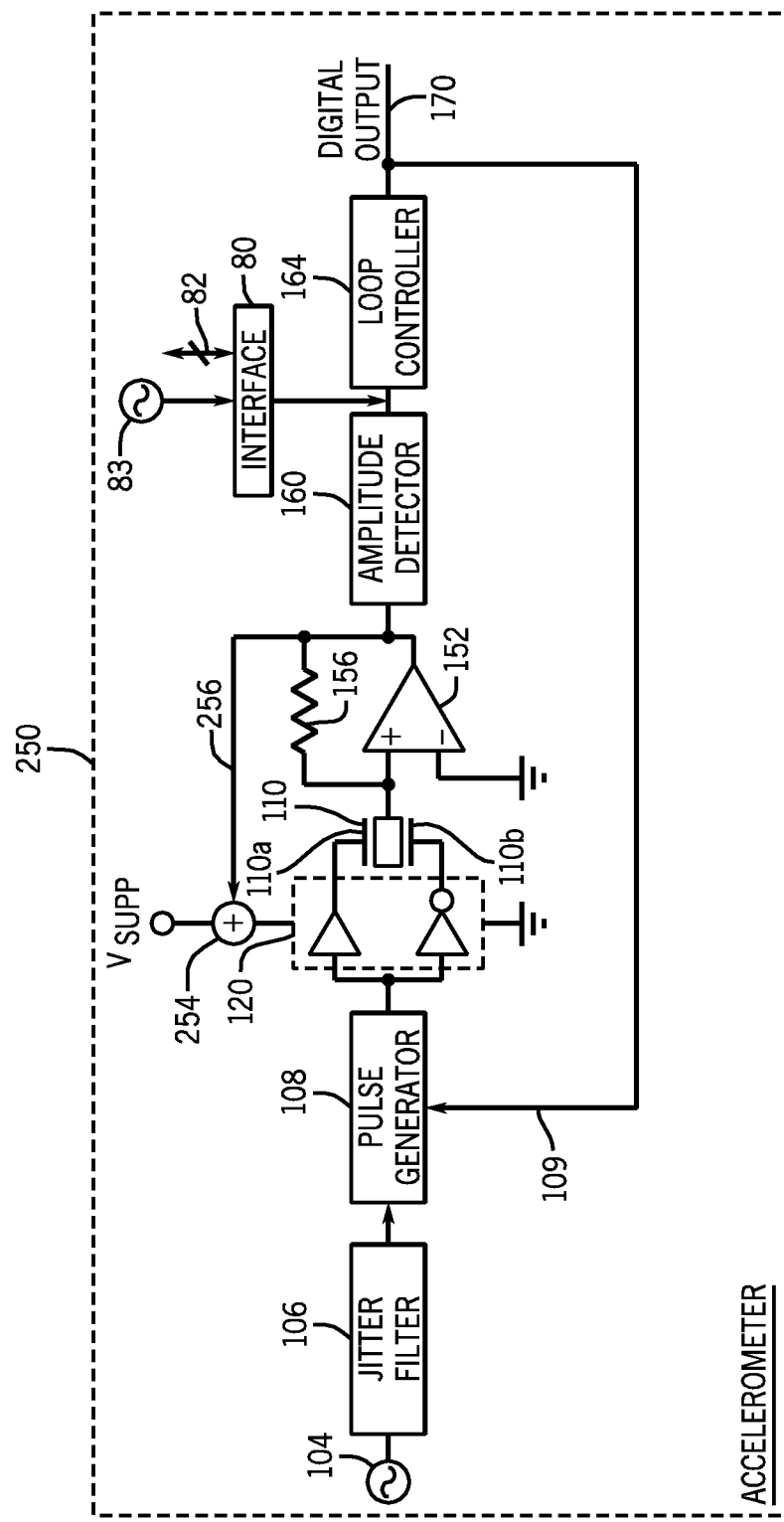

Referring to FIG. 5, in accordance with other embodiments of the invention, an accelerometer 250 may be used in place of the accelerometer 100 (FIG. 4). In general, similar reference numerals have been used in FIG. 5 to denote components that the accelerometers 100 (FIG. 4) and 250 (FIG. 5) share in common. Unlike the accelerometer 100, the accelerometer 250 employs a constant charge drive for the sensor 110. More specifically, the charge amplifier of the accelerometer 250 modulates, or adjusts, the actuation voltage based on the proof mass movement, thereby increasing the available signal-to-noise ratio.

More specifically, in accordance with embodiments of the invention, the charge amplifier of the accelerometer 250 does not include the feedback capacitor 154, which is employed by the accelerometer 119. Instead, the MEMS capacitor is incorporated into the feedback network of the charge amplifier. The output terminal of the amplifier 152 is connected to an adder 254 that combines the output signal from the amplifier 152 with the supply voltage $V_{SUPP}$. Due to this arrangement, the supply voltage that is applied to the logic 120 is modulated, according to the sensed signal that is provided at the output terminal of the amplifier 152; and as a result, the actuation force is independent of the proof mass movement.

Similar to the accelerometer 119, the accelerometer 250 includes a test signal source 83, which is coupled to the inverting input of the amplifier 152 and operates as described above. Moreover, the accelerometer 250 also includes the control interface 80, which may operate to perform one or more of the following functions: initiate the built-in self test; control the injection of the signal for the built-in self test; evaluate results of the built-in self test; communicate results of the test to external circuitry; etc.

Depending on the particular embodiment of the invention, the test signal source 83 may inject one of the following test signals. The test signal may be an arbitrary signal, especially if a digital-to-analog (DAC) is used in the feedback path. The test signal source 83 may be a white noise source, in accordance with some implementations. As other examples, the test signals may be any of the following or combinations of the following: a noise signal, an impulse signal, a single frequency sinusoidal signal, a dual frequency signal, a multitone signal, and a frequency sweep signal.

Depending on the particular embodiment of the invention, the evaluation of the performance of the accelerometer may include evaluating one or more of the following based on the response of the accelerometer (as observed at the accelerometer's output signal) to the test signal. A transfer function of the sensor 110, such as an open loop transfer function, may be determined. The Q factor of the sensor 110 may be determined. The performance evaluation may also or alternatively include evaluating the open loop total harmonic distortion and/or an intermodulation distortion. Moreover, the performance evaluation may involve evaluating a cross talk by testing one accelerometer channel via the test signal while the other channels record normal data. Thus, many variations are contemplated and are within the scope of the appended claims.

Figure 6:
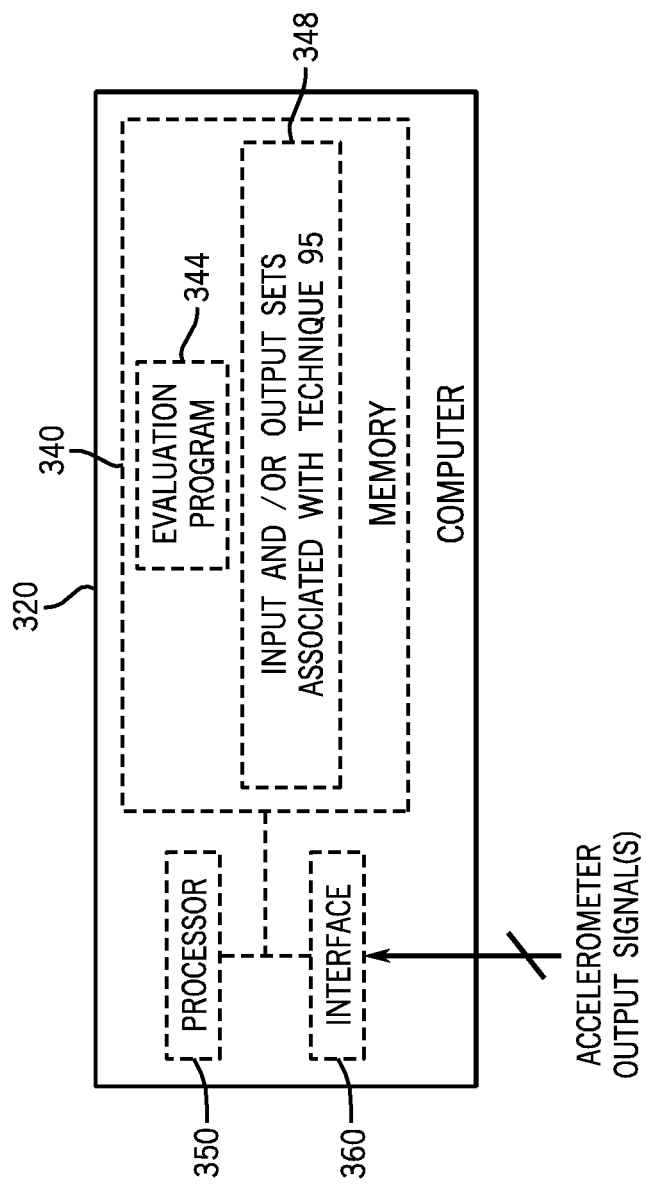
FIG. 6 is a schematic of a data processing system according to an embodiment of the invention.

Referring to FIG. 6, as a non-limiting example, the evaluation of the accelerometer's performance may be performed by a computer, or data processing system 320, in accordance with some embodiments of the invention. In general, the data processing system 320 may, for example, receive output signals from accelerometers in response to the accelerometers performing built-in self test; and the system 320 processes these signal to determine various performance aspects of the accelerometers as described above.

For this example, the data processing system 320 receives the self test results via an interface 360 and includes a processor 350 (one or more central processing units (CPUs) or processing cores, for example), which executes instructions in the form of an evaluation program 344 that may be stored in a memory 340 of the system 320 for purposes of determining performance parameters of the accelerometers. The memory 340 may also store input and/or output datasets 348 associated with the technique 95 that are processed and/or generated by the processor 350 as a result of the execution of the evaluation program 340. It is noted that the memory 340 may be non-transitory semiconductor memory, magnetic storage memory, optical storage memory, etc. and may be formed from more than one type of memory. Additionally, although FIG. 6 depicts the data processing system 320 as being contained in a box, the system 320 may be a distributed processing system formed from several computers, in accordance with some embodiments of the invention. Furthermore, although FIG. 6 depicts a simplified overview of the system 320, the system 320 may contain many other components (a graphics processor, a network interface, a display to display the calculated performance characteristics or accelerometer output signals, as non-limiting examples), in accordance with embodiments of the invention.

Other embodiments are contemplated and are within the scope of the appended claims. For example, in other embodiments of the invention, the accelerometer 100 and/or 250 may be part of a seismic sensor cable other than a streamer. As non-limiting examples, the accelerometer may be employed in a land-based seismic sensor cable or in a seabed-based seismic sensor cable. Moreover, in accordance with some embodiments of the invention, the accelerometer may be part of a wireless node, which temporarily stores acquired data (including the self-test signals and/or evaluation results) and communicates this data (upon demand or pursuant to a schedule) to a data acquisition system. As another example, the built-in self may be performed with reduced actuation voltages in accordance with some embodiments of the invention, as the reduced actuation voltages allows better measurements of the MEM-based sensor's open loop mechanical properties (Q value and natural frequency, as non-limiting examples). Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
using an accelerometer to provide an output signal indicative of an acceleration experienced by a movable mass of a sensor of the accelerometer at an output terminal of the accelerometer, the sensor having an open loop property exhibited by the sensor between an input terminal of the sensor and an output terminal of the sensor when the sensor is placed in an open loop; and
testing the accelerometer, the testing comprising:
using a closed loop to provide the output signal of the accelerometer, wherein the closed loop comprises the sensor and is adapted to provide a feedback signal to the sensor to cause the sensor to adjust a restoring force applied to the movable mass;
injecting a test signal into the closed loop between the output terminal of the sensor and the output terminal of the accelerometer; and
determining the open loop property of the sensor based on a response of the accelerometer to the injecting of the test signal into the closed loop.

2. The method of claim 1, wherein the closed loop comprises a feedforward path between the output terminal of the sensor and the output terminal of the accelerometer and a feedback path between the output terminal of the accelerometer and the sensor, and the injecting comprises injecting the test signal into the feedforward path.

3. The method of claim 1, wherein the sensor comprises a capacitive MEMS-based sensor.

4. The method of claim 1, further comprising
using an amplitude detector and a loop controller to generate the output signal of the accelerometer, wherein the injecting comprises injecting the test signal between an output terminal of the amplitude detector and an input terminal of the loop controller.

5. The method of claim 1, wherein the determining comprises determining performances of all components in the closed loop.

6. The method of claim 1, wherein the act of injecting comprises injecting a signal selected from the following: a sinusoidal signal, a dual frequency signal, a multitone signal, a noise signal and an impulse signal.

7. The method of claim 1, wherein determining the open loop property comprises determining a transfer function, a Q value, a total harmonic distortion or an intermodulation distortion.

8. An accelerometer comprising:
a closed loop comprising a sensor comprising a movable mass to sense an acceleration and an output terminal to provide an output signal indicative of the sensed acceleration, wherein the closed loop is adapted to provide a feedback signal to adjust a restoring force applied to the movable mass and the sensor having an open loop property exhibited b the sensor between an input terminal of the sensor and the output terminal of the sensor when the sensor is placed in an open loop; and
a tester adapted to inject a test signal into the closed loop between an output terminal of the sensor and the output terminal of the closed loop to cause a signal at the output terminal of the closed loop and determine the open loop property of the sensor in response to the signal.

9. The accelerometer of claim 8, wherein the closed loop comprises a feedforward path between the output terminal of the sensor and the output terminal of the closed loop and a feedback path between the output terminal of the closed loop and the sensor, and the tester is adapted to inject the test signal into the feedforward path.

10. The accelerometer of claim 8, wherein the sensor comprises a capacitive MEMS-based sensor.

11. The accelerometer of claim 8, wherein the accelerometer comprises an amplitude detector and a loop controller to generate the output signal of the accelerometer, and the tester is adapted to inject the test signal between an output terminal of the amplitude detector and an input terminal of the loop controller.

12. The accelerometer of claim 8, wherein the tester is adapted to inject a signal selected from the following: a sinusoidal signal, a dual frequency signal, a multitone signal, a noise signal and an impulse signal.

13. The accelerometer of claim 8, wherein the open loop property determined by the tester comprises a transfer function, a Q value, a total harmonic distortion or an intermodulation distortion.

14. An apparatus comprising:
a seismic acquisition system comprising at least one accelerometer comprising:
a closed loop comprising a sensor comprising a movable mass to sense an acceleration and an output terminal to provide an output signal indicative of the sensed acceleration, wherein the closed loop is adapted to provide a feedback signal to adjust a restoring force applied to the movable mass; and
a tester adapted to inject a test signal into the closed loop between an output terminal of the sensor and the output terminal of the closed loop to cause a signal at the output terminal of the closed loop and determine an open loop property of the sensor in response to the signal, the open loop property being exhibited by the sensor between an input terminal of the sensor and the output terminal of the sensor when the sensor is laced in an open loop.

15. The apparatus of claim 14, wherein the closed loop comprises a feedforward path between the output terminal of the sensor and the output terminal of the closed loop and a feedback path between the output terminal of the closed loop and the sensor, and the tester is adapted to inject the test signal into the feedforward path.

16. The apparatus of claim 14, wherein the sensor comprises a capacitive MEMS-based sensor.

17. The apparatus of claim 14, wherein the accelerometer comprises an amplitude detector and a loop controller to generate the output signal of the accelerometer, and the tester is adapted to inject the test signal between an output terminal of the amplitude detector and an input terminal of the loop controller.

18. The apparatus of claim 14, wherein the tester is adapted to inject a signal selected from the following: a sinusoidal signal, a dual frequency signal, a multitone signal, a noise signal and an impulse signal.

19. The apparatus of claim 14, wherein the seismic acquisition system comprises a streamer, a land-based sensor cable or a seabed-based sensor cable.

20. The apparatus of claim 14, wherein the seismic acquisition system comprises a streamer, the system further comprising:
a survey vessel to tow the streamer.

21. The apparatus of claim 14, wherein the seismic acquisition system is a wireless system comprising wireless nodes, and said at least one accelerometer is disposed in one of the wireless nodes.

22. The apparatus of claim 14, wherein the open loop property determined by the tester comprises a transfer function, a Q value, a total harmonic distortion or an intermodulation distortion.

* * * * *